United States Patent
Kunimochi et al.

(10) Patent No.: US 6,843,577 B2
(45) Date of Patent: Jan. 18, 2005

(54) SPREAD ILLUMINATING APPARATUS WITH PLURALITY OF LIGHT CONDUCTIVE BARS ARRAYED ADJACENTLY

(75) Inventors: Toru Kunimochi, Iwata-gun (JP); Shingo Suzuki, Iwata-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 13 days.

(21) Appl. No.: 10/246,724

(22) Filed: Sep. 19, 2002

(65) Prior Publication Data

US 2003/0058634 A1 Mar. 27, 2003

(30) Foreign Application Priority Data

Sep. 21, 2001 (JP) ........................................ 2001-289271

(51) Int. Cl.[7] .............................................. F21V 7/04
(52) U.S. Cl. .......................................... 362/31; 362/27
(58) Field of Search ................................ 362/26, 27, 31, 362/331, 339, 551, 555, 561, 558, 559; 385/146, 901

(56) References Cited

U.S. PATENT DOCUMENTS 6,280,044 B1 * 8/2001 Kusakabe .................... 362/31

2003/0021099 A1 * 1/2003 Suzuki et al. ................ 362/31

* cited by examiner

*Primary Examiner*—John Anthony Ward
*Assistant Examiner*—Hargobind S. Sawhney
(74) *Attorney, Agent, or Firm*—Oliff & Berridge, PLC

(57) ABSTRACT

The illuminating apparatus of the present invention has two light conductive bars which have one spot-like light source in common on their end surfaces, and which are disposed with their respective side surfaces facing each other and along the end surface of a light conductive plate. The spot-like light source has the center of its light emitting surface positioned to an interface portion between the two light conductive bars, whereby non-uniformity in brightness of lights at the end surfaces of the light conductive bars is diminished at the end surface of the light conductive plate with respect to the length direction of the light conductive bars while the lights emitted from the spot-like light source and introduced into the light conductive bars have their optical paths changed at respective optical path conversion means formed on the light conductive bars, and travel into the light conductive plate.

10 Claims, 7 Drawing Sheets

Section taken along B-B'
on the light conductive plate

Measurement direction

Measurement direction

Section taken along A-A'
on the light conductive plate

SPREAD ILLUMINATING APPARATUS WITH PLURALITY OF LIGHT CONDUCTIVE BARS ARRAYED ADJACENTLY

BACKGROUND OF THE INVENTION

1. Field of the Invention

The present invention relates to a spread illuminating apparatus suitable for a display device to operate with outside light, especially a liquid crystal display heavily used in a personal computer, a mobile communications device, and the like.

2. Description of the Related Art

A liquid crystal display (hereinafter referred to as LCD) featuring low profile, small occupying volume and light weight is used in many electric devices, such as a personal computer (hereinafter referred to as PC) and a mobile phone, and is expected to continue to be increasingly demanded.

A liquid crystal of the LCD does not emit light by itself, so the LCD requires an illuminating means to irradiate the liquid crystal when used in a place where sunlight or room lighting is not fully available. Since it is very inconvenient if an illuminating means is arranged discrete from an electric device equipped with an LCD, the illuminating means is usually arranged with the LCD as a unit. And, the illuminating means is required to be low in profile and small in power consumption, when used for a PC, in particular a notebook-size PC, and a mobile phone. These requirements are filled by a spread illuminating apparatus of side light type.

FIG. 11 is a perspective exploded view of a conventional spread illuminating apparatus of this type disclosed in Japanese Patent Laid-open No. 2000-11723. As shown in FIG. 11, a spread illuminating apparatus 1 is disposed over a front surface (upper side in the figure) F of a reflection-type liquid crystal element L, which is a main body of a reflection-type LCD. The spread illuminating apparatus 1 comprises a light conductive plate 2 made of a light-permissible material, a light conductive bar 7, and spot-like light sources 9, 9 such as light emitting diodes (LEDs).

The light conductive bar 7 is disposed with its side surface 13 in contact with an end surface 3 of the light conductive plate 2, and has the spot-like light sources 9, 9 arranged on its both end surfaces 8, 8, respectively. An optical path conversion means 11 adapted to direct lights from the spot-like light sources 9, 9 toward the end surface 3 of the light conductive plate 2 is formed on a side surface 14 of the light conductive bar 7 opposite to the side surface 13. The optical path conversion means comprises, for example, a plurality of grooves 15 substantially triangular in section and a plurality of flat portions 16 each present between adjacent grooves 15, 15.

In the spread illuminating apparatus 1 thus structured, lights from the spot-like light sources 9, 9 enter the light conductive bar 7, have their optical paths changed by the optical conversion means 11 formed on the side surface 14 of the light conductive bar 7, and are directed toward and introduced into the light conductive plate 2 through the end surface 3 of the light conductive plate 2. The lights introduced into the light conductive plate 2 travel toward an end surface 10 thereof opposite to the end surface 3 while repeating reflection and refraction therein, exit out meanwhile through a bottom surface thereof, and illuminate the reflection-type liquid crystal element L disposed close to a bottom surface 5 of the light conductive plate 2, whereby the reflection-type liquid crystal element L performs an emission (indirect emission) display.

The conventional illuminating apparatus 11 has the problem that the light exiting out from the side surface 13 of the light conductive bar 7 toward the end surface 3 of the light conductive plate 2 is not uniform in intensity along the length of the side surface 13.

FIG. 12 illustrates schematically the problem. Attention is now called to lights r3 and r4 which exit out orthogonally from the side surface 13 of the light conductive bar 7 in contact with the end surface 3 of the light conductive plate 2 and which are incident orthogonally on the end surface 3. Lights r1 and r2, from which the lights r3 and r4 originate, respectively, are parallel to each other if the grooves 15 (not shown in FIG. 12) formed on the light conductive bar 7 have a constant angle. This means that lights, from which the lights r1 and r2 originate, respectively, have respective different incidence points on the end surface 8 of the light conductive bar 7.

The intensity of the incident light on the end surface 8 of the light conductive bar 7 differs from point to point. Specifically, the intensity is high at a point in contact with the central portion of the spot-like light source 9, and low at a point in contact with the end portion thereof or not in contact with any portion hereof. Thus, the light r1 has a high intensity and the light r2 has a low intensity. Accordingly, as to the lights r3 and r4 exiting out from the side surface 13 of the light conductive bar 7, the light r3 has a high intensity and the light r4 has a low intensity, causing non-uniformity in the intensity of incident light on the end surface 3 of the light conductive plate 2. Further, lights r1' and r3' have a high intensity, and the lights r2' and r4' have a low intensity. FIG. 12 shows only the left end portion of the light conductive bar 7, but this happens also at the right end portion thereof.

In a spread illuminating apparatus shown in FIG. 13, the brightness was measured at the section taken along A–A' on the light conductive plate 2, and the brightness distribution α in FIG. 14 was obtained. As shown in FIG. 14, in the conventional apparatus, the light is not uniformly distributed (the distribution is not even) along the length of the light conductive bar 7, causing a problem that the light distribution at the light conductive plate 2 is not uniform.

SUMMARY OF THE INVENTION

The present invention has been made in the light of the above problem, and it is an object of the present invention to provide a spread illuminating apparatus, in which non-uniformity in brightness along the length of the light conductive bar is diminished, thereby rendering the surface of the light conductive plate uniformly bright.

In order to achieve the object, the spread illuminating apparatus may comprise: a light conductive plate made of a light-transmissible material; at least two light conductive bars made of a light-transmissible material, disposed with their one side surfaces facing an end surface of the light conductive plate, each having an optical path conversion mean formed on their side surfaces opposite to the one side surfaces, arrayed with their respective side surfaces facing each other, and oriented along and close to the end surface of the light conductive plate; and a spot-like light source disposed facing one end surfaces of the light conductive bars and having its light emitting surface positioned so as to cover all interfaces between adjacent light conductive bars. Here, the light conductive bars may include another spot-like light source disposed facing the other end surfaces thereof.

Further, the spread illuminating apparatus may comprise: a light conductive plate made of a light-transmissible material; at least three light conductive bars made of a light-transmissible material, arrayed with their respective side surfaces facing each other, disposed with their one side surfaces facing an end surface of the light conductive plate, and oriented along and close to the end surface of the light conductive plate; and at least two spot-like light sources, rather than one, disposed facing one end surfaces of the light conductive bars and arranged such that at least one thereof has its light emitting surface positioned so as to cover at least one interface between adjacent light conductive bars, and that each of the other(s) has its emitting surfaces positioned to cover an end surface of each of light conductive bars not covered by the at least one spot-like light source. Here the light conductive bars may include another at least two spot-like light sources symmetrically disposed facing the other end surfaces thereof.

DESCRIPTION OF THE PREFERRED EMBODIMENTS

Figure 1:
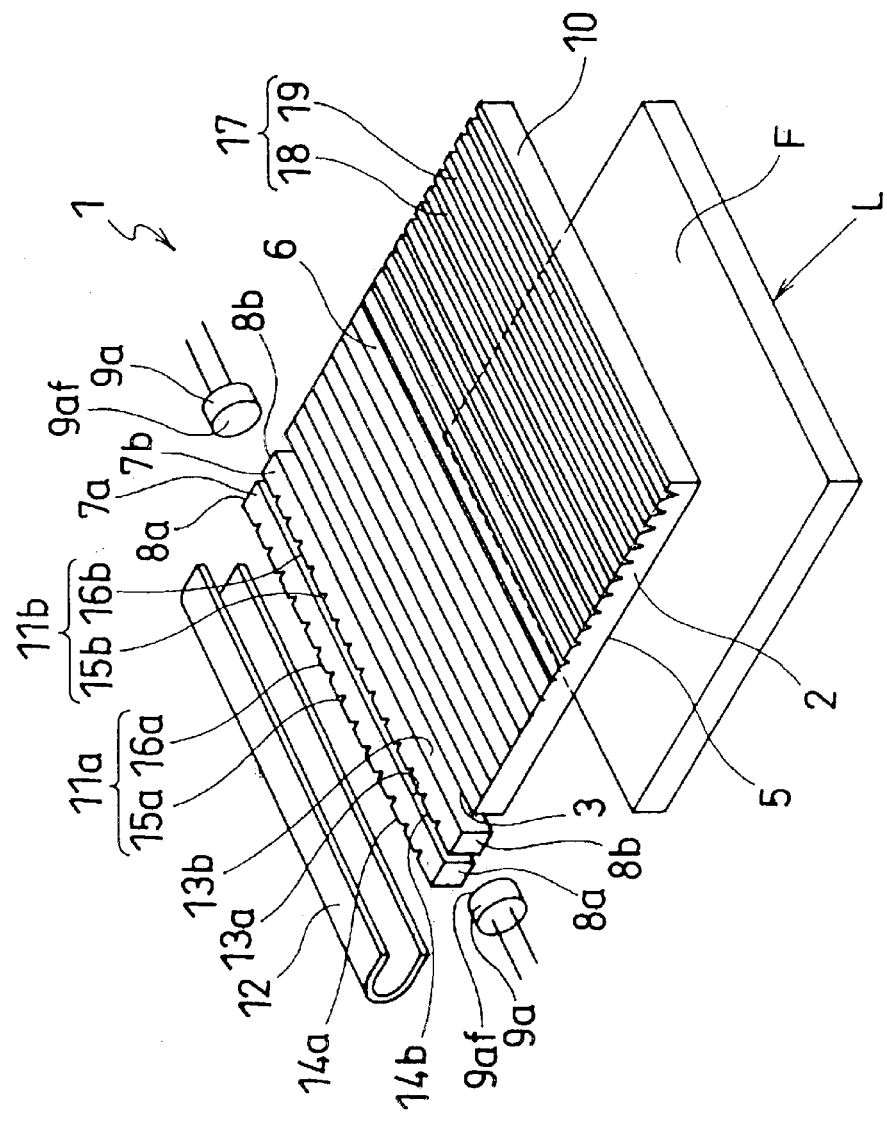
FIG. 1 is an exploded perspective view of a spread illuminating apparatus of the present invention.

Preferred embodiments of the present invention will be described with reference to the drawings. Referring to FIG. 1, a spread illuminating apparatus 1 is disposed over a front surface (upper side in the figure) F of a reflection-type liquid crystal element L, which is a main body of a reflection-type LCD. The spread illuminating apparatus 1 comprises a light conductive plate 2 made of a light-transmissible material, a plurality (two in this embodiment) of light conductive bars 7a, 7b made of a light-transmissible material and uniform in configuration and size, and a prescribed number (two in this embodiment) of spot-like light sources 9a, 9b, such as LEDs.

The two light conductive bars 7a, 7b are disposed adjacent to each other with their one side surfaces facing one end surface 3 of the light conductive plate 2 such that lights emitted from the spot-like light sources 9a, 9a have their respective optical paths changed at respective optical path conversion means 11a, 11b (to be described later) so as to be made incident on the end surface 3 of the light conductive plate 2. One light conductive bar 7b of the two, which is positioned closer to the light conductive plate 2, is disposed with its side surface 13b in contact with the end surface 3 of the light conductive plate 2. A side surface 14b of the light conductive bar 7b opposite to the side surface 13b is in contact with a side surface 13a of the other light conductive bars 7a of the two.

Each of the two spot-like light source 9a, 9a is fixedly attached to end surfaces 8a, 8b of the two light conductive bars 7a, 7b such that the center of an emitting surface 9af thereof is positioned at the interface between the side surface 13a of the light conductive bar 7a and the side surface 14b of the light conductive bars 7b.

The light conductive bars 7a, 7b have the aforementioned optical path conversion means 11a, 11b formed on their side surfaces 14a, 14b, respectively. The optical path conversion means 11a (11b) comprises a plurality of grooves 15a (15b) substantially triangular in section and a plurality of flat portions 16a (16b) each present between adjacent grooves 15a, 15a (15b, 15b), and is adapted to guide lights emitted from the spot-like light sources 9a, 9a toward the end surface 3 of the light conductive plate 2.

The light conductive plate 2 has a light reflection pattern 17 formed on its top surface 6 in parallel with the end surface 3. The light reflection pattern 17 comprises a plurality of grooves 18 substantially triangular in section and a plurality of flat portions 19 each present between adjacent grooves 18, 18. The interval between the grooves 18, 18 varies according to the distance from the end surface 3 of the light conductive plate 2, whereby lights exit out uniformly from a major surface (bottom surface 5 in this case) of the light conductive plate 2 independent of the distance from the end surface 3.

A light reflection member 12, which is adapted to efficiently guide lights leaking from the light conductive bars 17a, 17b into the light conductive plate 2, is disposed so as to enclose the light conductive bars 7a 7b, and the end part of the light conductive plate 2 positioned close to the light conductive bar 7b such that the longitudinal surfaces of the light conductive bars 7a, 7b are covered except the side surfaces 13a, 13b of the light conductive bars 7a, 7b.

In the spread illuminating apparatus structured above, lights emitted from the spot-like light sources 9a, 9a go into the light conductive bars 7a, 7b, have their optical paths changed at the optical path conversion means 11a, 11b formed parallel to the end surface 3 of the light conductive plate 2, and travel into the light conductive plate 2 through the end surface 3. The lights introduced into the light conductive plate 2 travel toward the other end surface 10 of the light conductive plate 2 while repeating reflection and refraction therein, exit out partly meanwhile through the bottom surface 5, and illuminate the reflection-type liquid crystal element L disposed close to the bottom surface 5, whereby the reflection-type liquid crystal element L performs an emission (indirect emission) display.

Figure 2:
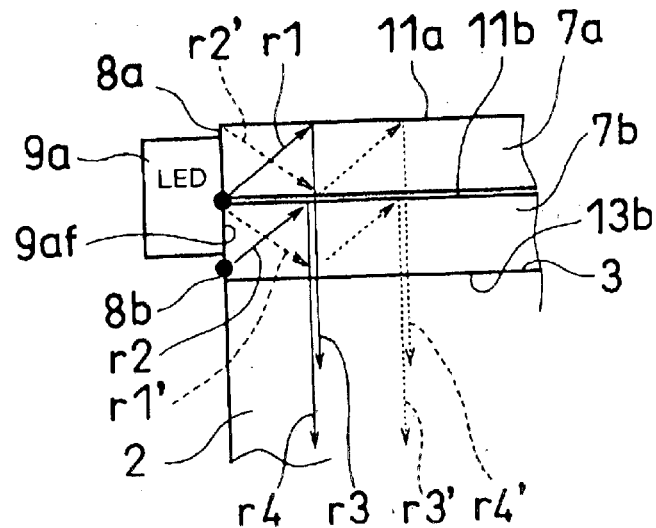
FIG. 2 is a schematic view of how non-uniformity in brightness is diminished in the illuminating apparatus of the present invention.
Figure 12:
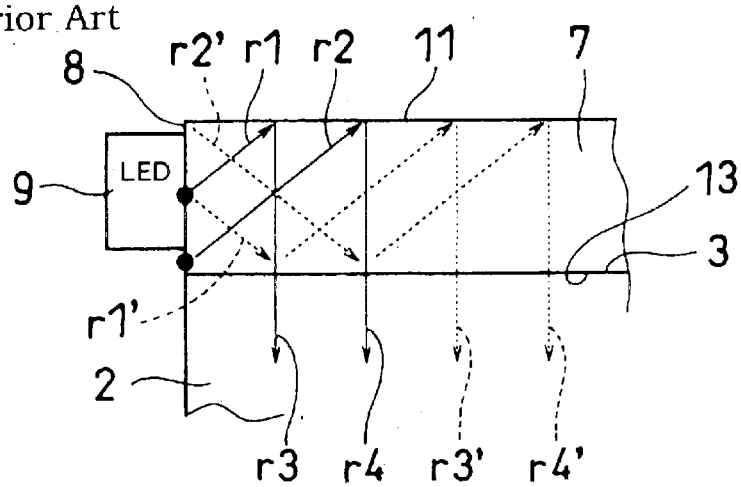
FIG. 12 is a schematic view of how non-uniformity in brightness is caused in the conventional spread illuminating apparatus.
Figure 13:
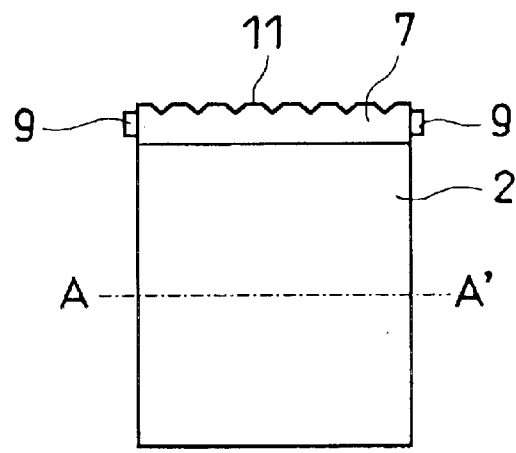
FIG. 13 is a top plan view of the conventional spread illuminating apparatus shown in FIG. 11, showing its assembled state.
Figure 14:
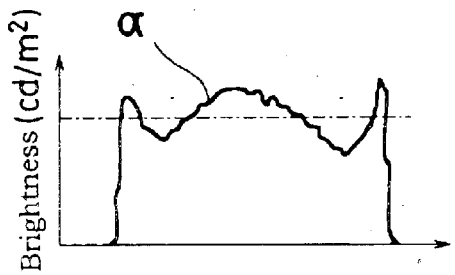
FIG. 14 is a graph of the brightness distribution at the section taken along A–A' on a light conductive plate in FIG. 13.

In the above spread illuminating apparatus, the non-uniformity in brightness along the length of the light conductive bar 7b at the side surface 13b, from which lights exit out to go into the light conductive plate 2, is diminished as illustrated in FIG. 2. Referring to FIG. 2, lights r1 and r2 (corresponding to the lights r1, r2 in FIG. 12, respectively), which go into the light conductive bars 7a, 7b through respective different spots at the end surfaces 8a, 8b, have their optical paths changed at the optical path conversion means 11a, 11b. Specifically, the light r1 has its optical path changed at the optical path conversion means 11a thereby turning into light r3 and is incident on the end surface 3 of the light conductive plate 2, and the light r2 has its optical path changed at the optical conversion means 11b thereby turning into light r4 and is incident on the end surface 3. Here, the lights r3 and r4 are aligned to each other as shown in the figure.

The intensity of incident light on the end surface 8a, 8b differs from spot to spot. The intensity is high at a spot positioned to the center part of the emitting surface 9af, and low at a spot positioned to the end part of the emitting surface 9af or positioned off the emitting surface 9af. This means that the light r1 has a high intensity and the light r2 has a low intensity, accordingly the light r3 has a high intensity and the light r4 has a low intensity. In the conventional apparatus, the difference in incidence position of the lights r1 and r2 at the end surface 8 of the light conductive bar 7 carries through straight as the difference in incidence position of the lights r3 and r4 at the end surface 3 of the light conductive plate 2 (see FIG. 12), thereby causing non-uniformity in brightness with respect to the length direction of the light conductive bar 7.

In the apparatus of the present invention, the lights r3 and r4, which originate respectively from the lights r1 and r2 incident on different end surfaces 8a, 8b of the light conductive bars 7a, 7b, are aligned to each other to be incident on the same spot at the end surface 3 of the light conductive plate 2 as described above. Since the light r3 has a high intensity and the light r4 has a low intensity, the intensity of light consisting of the lights r3 and r4 aligned to each other is modified closer to the average intensity along the length direction of the light conductive bars 7a, 7b. This is the case also with lights r1' and r2', and lights r3' and r4' originating from the lights r1' and r2', respectively. In FIG. 2, the left end part of the light conductive bars 7a, 7b is explained, but this applies also to the right end part thereof.

Figure 3:
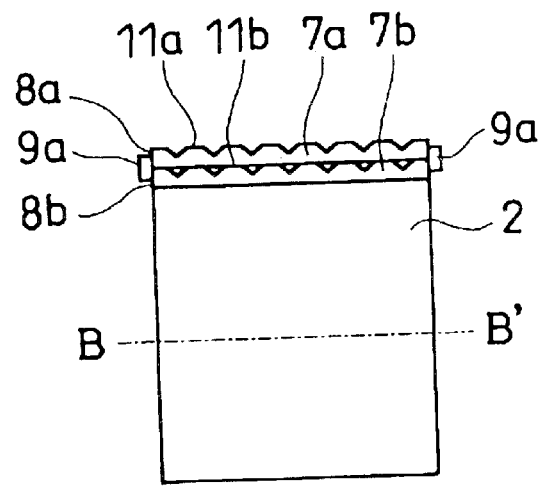
FIG. 3 is a top plan view of the spread illuminating apparatus shown in FIG. 1, showing its assembled state.
Figure 4:
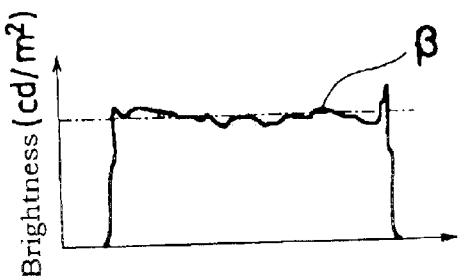
FIG. 4 is a graph of brightness distribution at the section taken along B–B' on a light conductive plate in FIG. 3.

In the apparatus of the present invention assembled as shown in FIG. 3, the brightness was measured at the section taken along B–B' on the light conductive plate 2, and the brightness distribution β shown in FIG. 4 was obtained. As seen from the distribution β the brightness at the side surface 13b is almost uniform (the distribution curve is almost even) along the length of the light conductive bar 7a, thereby realizing uniform brightness on the light conductive plate 2 with regard to the same direction (the length of the light conductive bar 7a).

Figure 5:
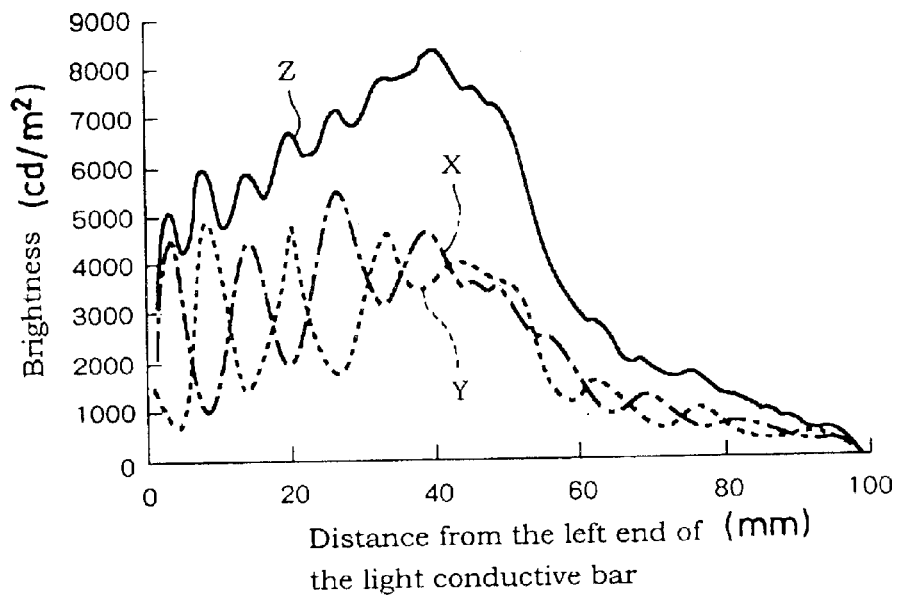
FIG. 5 is a graph of brightness distributions obtained by way of light conductive bars in FIGS. 3, 6 and 7 along the length direction of respective light conductive bars when a spot-like light source is provided only at one end surface thereof.

In FIG. 5, brightness of light incident on the end surface 3 of the light conductive plate 2 (when the spot-like light source 9a is disposed only at the left end surfaces 8a, 8b of the light conductive bars 7a, 7b) is shown as a function of the distance from the spot-like light source 9a (the end surfaces 8a, 8b). This also indicates that the brightness of light incident on the end surface 3 of the light conductive plate 2 is made uniform.

Figure 6:
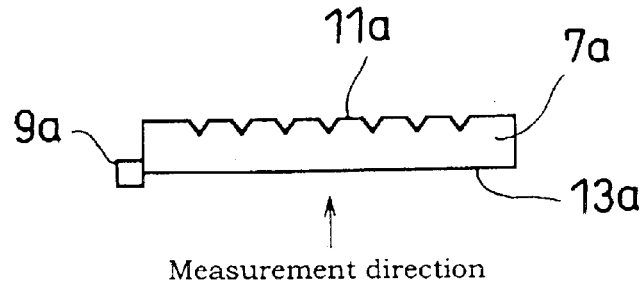
FIG. 6 is a top plan view of one of the light conductive bars, which produces the brightness distribution X.
Figure 7:
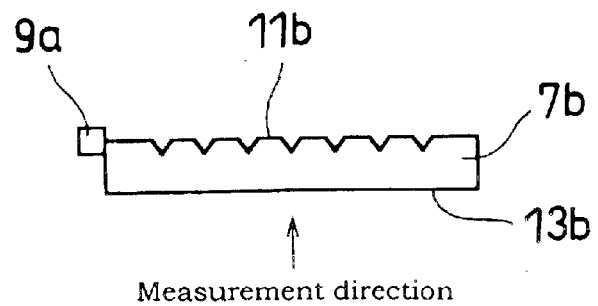
FIG. 7 is a top plan view of another one of the light conductive bars, which produces the brightness distribution Y.

Referring to FIG. 5, the chained line X shows the distribution produced by way of the light conductive bar 7a only (see FIG. 6), the dashed line Y shows the distribution produced by way of the light conductive bar 7b only (see FIG. 7), and the solid line Z shows the distribution produced by way of the light conductive bars 7a, 7b adjacently combined (see FIG. 3). The lines X and Y, which are produced by the light conductive bar 7a only, and 7b only, respectively, show a large fluctuation according to the distance from the spot-like light source 9a, while the line Z, which is produced by the light conductive bar 7a, 7b adjacently combined, shows a small fluctuation. And, the apparatus of the present invention with two light conductive bars combined has an increased average brightnesss of light at the light conductive plate 2 by more than 10% compared with the conventional apparatus with one light conductive bar. Thus, the present invention with two light conductive bars combined proves to be effective also in increasing brightness.

Figure 8:
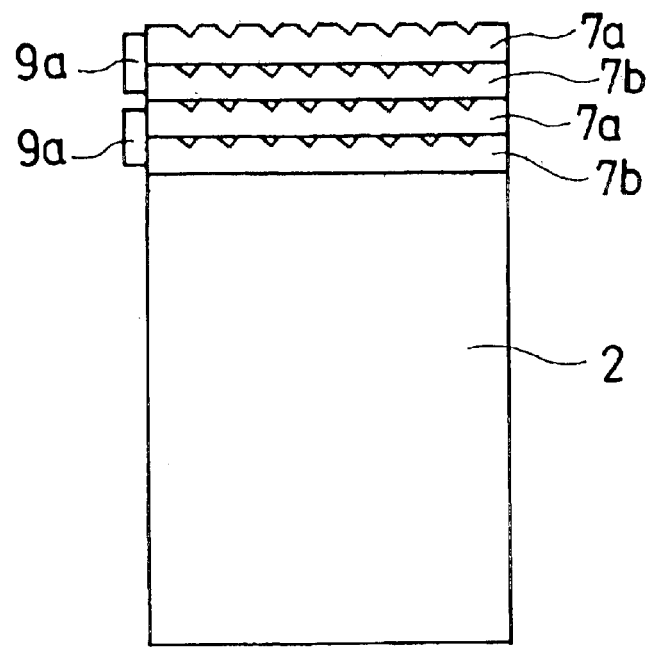
FIG. 8 is a top plan view of another embodiment of the present invention.
Figure 9:
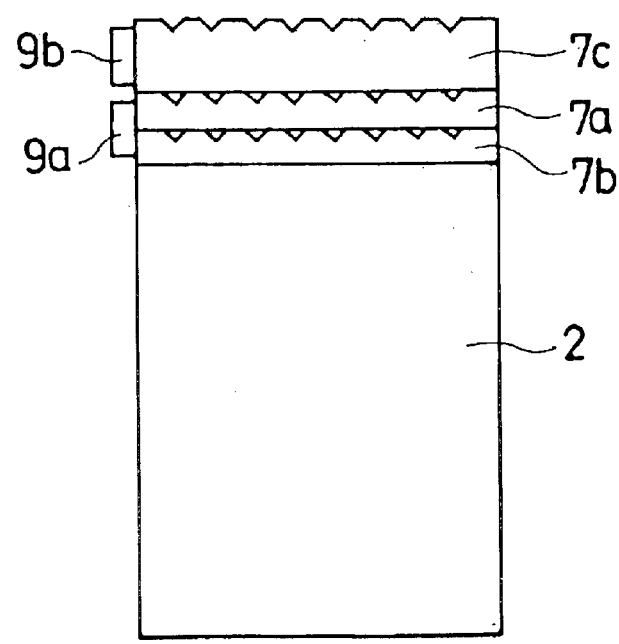
FIG. 9 is a top plan view of further embodiment of the present invention.
Figure 10:
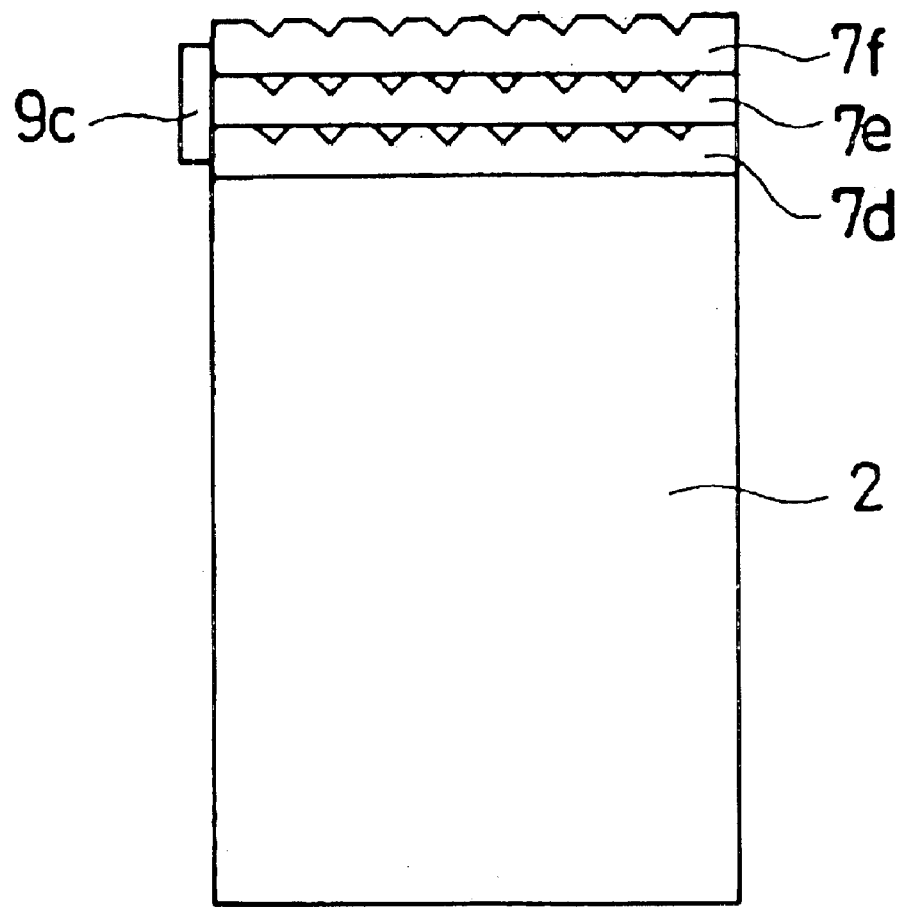
FIG. 10 is a top plan view of still further embodiment of the present invention.
Figure 11:
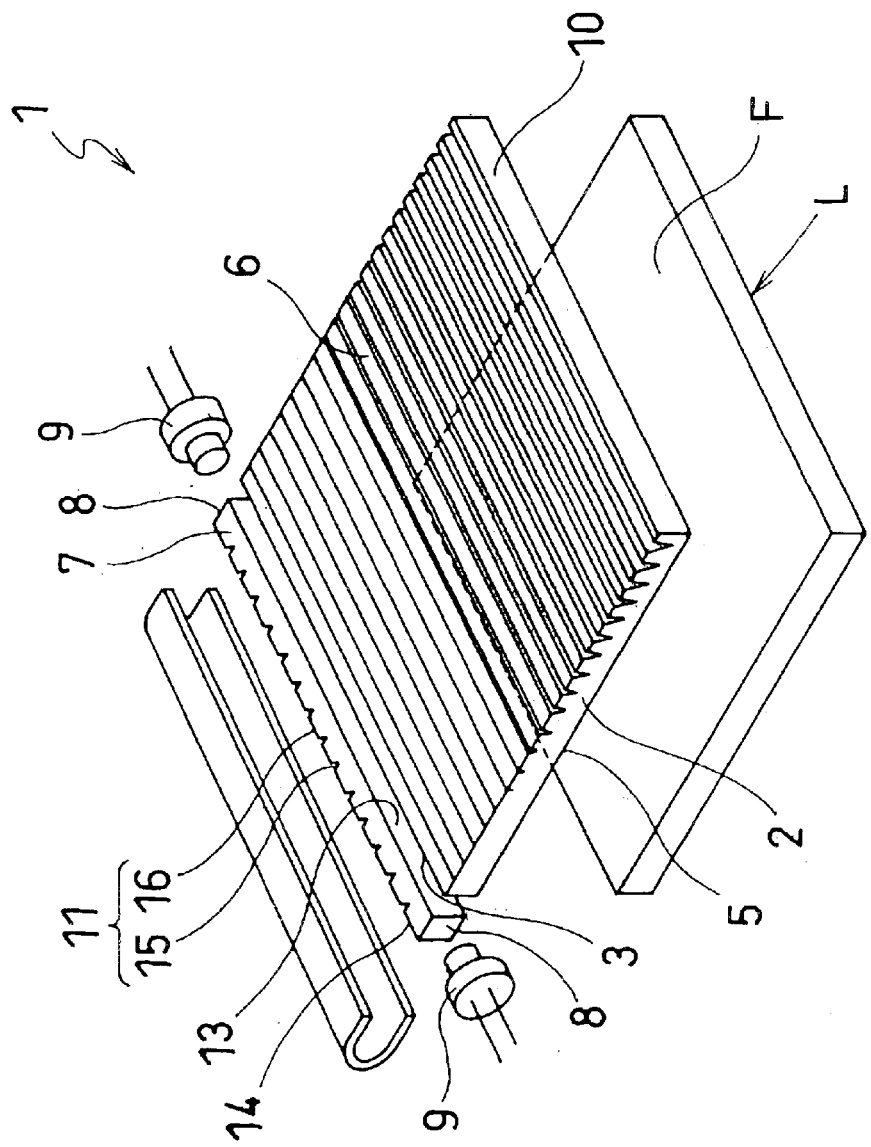
FIG. 11 is an exploded perspective view of a conventional spread illuminating apparatus.

In the present invention, the spot-like light source is not limited to an LED, and also the numbers of the light conductive bars and the spot-like light sources, and the structures of the optical conversion means and the light reflection pattern are not limited to those taken as examples in the above described embodiments. When n (n: an integer of 2 or more) pieces of spot-like light sources are provided each to cover the end surfaces of two light conductive bars, (2×n) pieces of light conductive bars may be used (see FIG. 8). Each of all spot-like light sources provided does not have to cover two light conductive bars, but at least one thereof may cover two light conductive bars (see FIG. 9) thereby improving the uniformity in the brightness distribution compared with the conventional apparatus. Further, one spot-like light source may cover three or more light conductive bars (see FIG. 10) instead of two, which also diminishes the unevenness in brightness compared with the apparatus provided with one light conductive bar. Note that numerical sign 2 indicates a light conductive plate, 7a to 7f light conductive bars, and 9a to 9c spot-like light sources, respectively.

The device to be illuminated by the apparatus of the present invention is not limited to the reflection-type liquid crystal display (reflection-type liquid crystal element). And the apparatus of the present invention may be disposed over the top (front) surface of the device to be illuminated, or may alternatively be disposed under the bottom (back) surface thereof. Generally speaking, the apparatus is disposed over the top (front) surface of a reflection-type device, and under the bottom (back) surface of a transmission-type device. Also, a plate-like member adapted to diffuse light (light-diffusive plate) may be disposed between the light conductive bar and the light conductive plate.

The spread illuminating apparatus structured as described above reduces the fluctuation in brightness (intensity) of the light incident on the end surface of the light conductive plate with regard to the length direction of the light conductive bars. Accordingly, the non-uniformity in brightness along the length of the light conductive bars can be diminished, and so the brightness over the light conductive plate can be made uniform, and the average brightness over the light conductive plate can be increased at the same time.

What is claimed is:

1. A spread illuminating apparatus comprising:
   a light conductive plate made of a light-transmissible material;
   at least two light conductive bars made of a light-transmissible material, each disposed with their light exiting surface facing an end surface of the light conductive plate, each of the light conductive bars having an optical path conversion means formed on an opposing surface to the light exiting surface, each light conductive bar arrayed with the respective opposing surface and light exiting surface facing each other, and oriented along and close to the end surface of the light conductive plate; and a spot-like light source disposed facing one end surfaces of the light conductive bars, the spot-like light source having its light emitting surface positioned to cover all interface portions between adjacent light conductive bars.

2. A spread illuminating apparatus according to claim 1, further including a spot-like light source symmetrically disposed facing the other end surfaces of the at least two light conductive bars.

3. A spread illuminating apparatus comprising:

a light conductive plate made of a light-transmissible material;

at least three light conductive bars made of a light-transmissible material, each disposed with their light exiting surface facing an end surface of the light conductive plate, each of the light conductive bars having an optical path conversion means formed on an opposing surface to the light exiting surface and each light conductive arrayed with the respective opposing surface and light exiting surface facing each other, and oriented along and close to the end surface of the light conductive plate; and at least two spot-like light sources disposed facing one end surfaces of the light conductive bars, the spot-like light sources being arranged such that at least one of the at least two spot-like light sources has its light emitting surface positioned to cover at least one interface portion between adjacent light conductive bars, and other of the at least two spot-like light sources has its light emitting surface positioned to face an end surface of each of light conductive bars not covered by the at least one of the at least two spot-like light source.

4. A spread illuminating apparatus according to claim 3, further including at least two spot-like light sources equal in number to the at least two and symmetrically disposed facing the other end surfaces of the at least three light conductive bars.

5. A spread illuminating apparatus comprising:

a light conductive plate having a light incident surface;

a plurality of light conductive bars, each having opposing ends and a light exiting surface, the light exiting surface of each of the plurality of light conductive bars are oriented to face the light incident surface of the light conductive plate; and a light source disposed at one of the opposing ends of the plurality of light conductive bars.

6. The spread illuminating apparatus according to claim 5, wherein the plurality of light conductive bars further include an optical path conversion surface that is opposite the light exiting surface and the plurality of light conductive bars are arranged so that the light exiting surface of one of the plurality of light conductive bars is adjacent to the optical path conversion surface of another one of the plurality of light conductive bars.

7. The spread illuminating apparatus according to claim 6, wherein the light source has an emitting surface that is positioned at one of the opposing ends to cover an interface portion between adjacent light conductive bars.

8. The spread illuminating apparatus according to claim 7, wherein another light source is positioned at the other of the opposing ends to cover the interface portion between adjacent light conductive bars.

9. The spread illuminating apparatus according to claim 5, wherein at least one of the light conductive plate and the plurality of light conductive bars is made of a light-transmissible material.

10. The spread illuminating apparatus according to claim 5, further comprising a light source at the other of the opposing ends of the plurality of light conductive bars.

* * * * *